April 21, 1964     M. D. McCORMICK     3,129,516
RECORDING ATTACHMENT FOR WHEEL ALINEMENT TESTERS
Filed April 2, 1962
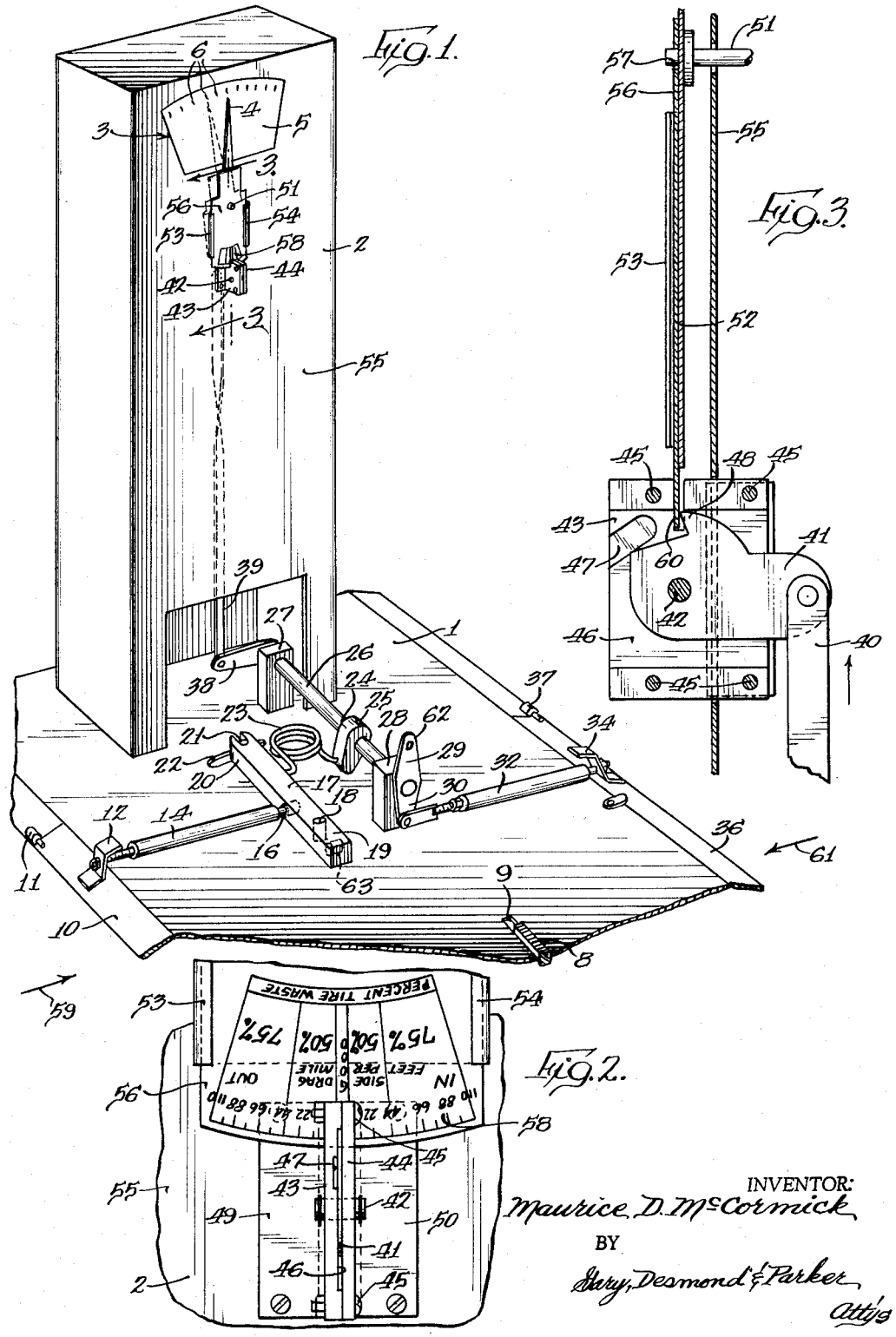
INVENTOR:
Maurice D. McCormick
BY
Stary, Desmond & Parker
Att'ys

United States Patent Office 3,129,516
Patented Apr. 21, 1964

3,129,516
RECORDING ATTACHMENT FOR WHEEL
ALINEMENT TESTERS
Maurice D. McCormick, Prospect Heights, Ill., assignor to Bear Manufacturing Company, Rock Island, Ill., a corporation of Delaware
Filed Apr. 2, 1962, Ser. No. 184,328
11 Claims. (Cl. 33—203.14)

The present invention relates to apparatus for testing the alinement of the steering wheels of vehicles, and particularly, to apparatus for determining the scuffing action between the steering wheel tires and the road and indicating the correction required to reduce scuffing, minimize tire wear and obtain optimum steering conditions.

United States Patent No. 1,890,218 discloses an apparatus for determining the scuffing action, if any, between a vehicle tire and the road. The apparatus comprises a drive-over support, wheel contacting elements engaged by the tires and shifted thereby, if scuffing is present, to a degree proportional to the scuffing or side slipping action of the tires, and an indicator coupled to said elements for indicating whether the scuffing is to the left or right and the amount thereof, e.g., the side drag in feet per mile. If no side drag or scuffing is present, the indicator provides a center reading to show that no correction is required. If scuffing is present, correction may be effected in manners well-known to automotive personnel by adjustment as necessary of one or more of the major angular relationships of steering wheels, i.e., camber, caster, steering axis inclination, turning radius and toe.

While the patented apparatus provides an accurate indication of tire scuffing, it has the shortcoming that immediate visual reading and manual recording are required to obtain a permanent record of the scuffing condition. The apparatus is used repeatedly as vehicles roll over it one after the other, and unless a record is made immediately it may be too late as another vehicle may follow and cause the apparatus automatically to zero itself and provide a new reading for the following vehicle.

The object of the present invention is to provide in scuff measuring apparatus of the type described means for automatically recording the indicator reading as the vehicle rolls over the apparatus.

Another object of the invention is to provide means for permanently recording the indicator reading on a record card, and preferably on an appropriate scale printed on the card.

A further object of the invention is the provision of recording means comprising a record card holder movable in response to the scuff determining apparatus from a zero position to scuff indicating positions, and a marker located at said zero position for marking on the card the position to which it was moved by said apparatus.

An additional object is to provide a simple and convenient mounting for the record card adjacent to the indicator so that movement of the indicator locates the record card relative to the marker.

It is still another object of the invention to provide means for automatically recording the indicator reading on the record card upon motion of the vehicle over the apparatus, and for automatically resetting the means after recording and prior to measuring the tire scuff of the next vehicle to be tested.

It is also an object of the invention to provide scuff recording mechanism which is readily adaptable to existing scuff measuring apparatus to facilitate its incorporation therein at minimum cost.

A still further object is the provision of scuff recording mechanism of rugged construction that is simple and inexpensive to manufacture.

Other objects and advantages of the invention will become apparent in the following detailed description wherein reference is made to the accompanying drawings, in which:

FIGURE 1 is a perspective view of the indicator end portion of scuff measuring apparatus provided with scuff recording mechanism in accordance with this invention;

FIGURE 2 is a front elevation, on an enlarged scale, of a record card and the portion of the mechanism comprising the card holder and marker; and FIGURE 3 is a vertical section taken substantially along line 3—3 of FIGURE 1 and showing the locations of the card holder and marker with respect to the indicator.

Referring to the drawings, and particularly to FIGURE 1, the scuff determining apparatus includes a drive-over wheel supporting surface 1 and a vertically extending standard or indicator housing 2. Within the housing 2 an indicator 3 is provided, the same including a pivotally movable indicator needle 4 and a dial 5 having graduated markings 6 thereon disposed to opposite sides of a central zero.

The indicator needle 4 is caused to move angularly by mechanism (not shown) equivalent to that disclosed in the patent to Duby 1,890,218 previously mentioned. The mechanism involved is connected to be actuated by scuff determining or measuring bars 8 (one shown) which project upwardly through slots 9 in the wheel support 1. The bars 8 are adapted to be moved longitudinally of their lengths transversely of the vehicle in the direction of and by an amount proportioned to the scuffing or side drag of the tires on the wheels rolling thereover. Therefore, the indicator needle 4 pivots to one side or the other of its central zero to a reading on the graduated dial 5 determined by the movement of the bars 8 in response to the side drag or scuffing of the tires.

A reset treadle 10 is hinged at 11 to the leading end of the support 1, i.e., that end thereof first contacted by a vehicle in its passage over said surface. The treadle 10 carries an angle 12 which is connected to one end of a link 14, the other end 16 of which is secured by a swivel connection to a reset lever 17. The lever 17 is pivoted to the surface 1 on a pivot pin 18 adjacent its outer end, and the same is provided at its inner end with a yoke 20 which freely engages a pin 21 movable in a slot 22 in the surface 1.

The pin 21 is connected to correcting mechanism (not shown), which may be of the type disclosed in Duby 1,890,218 and which resets the indicator needle 4 to the zero position on the dial 5 each time the pin 21 is moved to the right by the reset lever 17. Movement of the reset lever 17 to the right occurs when the reset treadle 10 is depressed by passage thereover of vehicle wheels. Upon release, the reset treadle 10, the reset lever 17 and the pin 21 are returned to normal position by a spring 23.

To the extent thus far described, the apparatus in general comprises the scuff measuring or determining device of the Duby patent. As will become apparent as the description proceeds, the present invention is readily applied to this apparatus, and to other known scuff measuring apparatus.

In accordance with the present invention, a shaft 26 is journalled in two spaced apart trunnions 27 and 28 extending upwardly from the surface 1, and the same is biased to a normal circumferential position by the return spring 23 of the reset mechanism. Specifically, the spring is confined between the lever 17 and a crank 24 adjustably mounted on the shaft 26 by a set screw 25. The shaft parallels the treadle 10 and carries at its outer end a two-arm crank 29 which is pivotally connected by one arm thereof to one end of a connecting link 32. The link 32 is secured at its other end to an angle 34 which is secured to a recording treadle 36 hinged at 37 to the trailing end of the surface 1 in spaced parallel relation to the shaft 26 and the treadle 10.

At its inner end, the shaft 26 carries a crank 38 having a free end pivotally connected to the lower end of a link 39, the upper end 40 of which (FIGURE 3) is pivotally connected to a movable element of a means for making a permanent record of a test. In the preferred embodiment of the invention, the link 39 is pivotally connected to a bell-crank lever 41 journalled on a pin 42 extending through two parallel side plates 43 and 44 which are joined together by screws or other fasteners 45. The side plate 43 is provided with a slot 46 affording room for the lever 41, and it is also provided with a narrow slot 47 accommodating discharge of slugs punched out of the record cards used with the device. The bell-crank lever 41 has a projecting sharp punch 48 which punches out the slugs. The side plates 43 and 44 are provided with laterally extending flanges 49 and 50 for attachment to the front wall 55 of the standard 2 adjacent the indicator 3.

The indicator needle 4 is secured to a pivot shaft 51 which extends forwardly of the front wall 55 of the standard 2. Secured to the forward end of the shaft, preferably in diametric opposition to the needle 4, is a record card holder 52 comprising a base portion and side flanges 53 and 54 which fold around into spaced parallel relation to said base portion. A record card 56 is adapted to be placed on the holder 52 with its side margins confined by the flanges 53 and 54 thereby to support the card in depending relation to the needle 4. If desired, the shaft 51 may project through the holder 52 and the card may be provided with a centering hole for guidable support on the shaft.

The bottom edge of the record card (as viewed in FIGURE 2) is arcuate and concentric with the shaft 51 thereby to accommodate arcuate or pivotal movement of the card while maintaining the edge of the card in predetermined position relative to the punch 48. Along the bottom of the card, I provide graduated scale 58 corresponding to the scale 6. Therefore each time the needle 4 is moved, the card is pivoted a proportional amount to aline the respective marking on its scale 58 with the punch 48. Upon downward movement of the recording treadle 36, the link 39 is elevated because of movement of the link 32 to the left and this causes the bell-crank lever to rotate counterclockwise and cause the punch 48 to punch a slug out of the edge of the record card 56.

In a normal sequence of operation, a vehicle is driven over the reset treadle 10 in the direction of the arrow 59 to cause the lever 17 to reset the indicator needle 4 to zero. Then, the tires of the vehicle roll over the indicator bars 8 which shift in their slots 9 if scuffing is present. This causes a movement of the needle 4 to indicate the amount and direction of scuffing or side drag of the tire. At the same time, the record card 56 is pivoted to aline a corresponding part of its scale with the punch 48. As the tires continue rolling, they depress the recording treadle 36 to actuate the punch to remove a slug from the card adjacent its bottom edge.

As the tire rolls off of the recording treadle 36, the spring 23 returns the treadle and the punch to their normal positions.

Should the rear wheels of the vehicle roll over the surface 1 before the record card 56 is removed from the holder 52, the above sequence of operations is repeated, but since there is ordinarily no scuffing of the rear tires, this simply produces a zero reading which is ignored.

The apparatus can also be used for vehicles moving in the direction of the arrow 61 by slight modification. The telescopically adjustable link 32 is lengthened and connected between the angle 12 and the upper end 62 of the link 29 to allow the treadle 10 to be used as the recording treadle. The link 14 is adjusted and connected between the angle 34 and a swivel connecting region 63 of the reset lever 17 so that the treadle 36 can be used as the reset treadle. The action occuring upon movement of a vehicle in the direction of arrow 61 is then identical to that above described.

Viewing FIGURE 2 upside down, a novel indication of the consequence of misalinement of the steering wheels of vehicles is afforded by the record card of the invention. Specifically, scuffing is indicated in side drag in feet per mile, i.e., the number of feet the tires are dragged sideward in every mile driven, and this is converted to percent tire waste, i.e., the percentage by which tire life is decreased due to dragging. Specifically, from about 2 to about 45 feet per mile of side drag causes a 50% waste of the tires, and from about 45 to 110 feet per mile of side drag causes a 75% waste of the tires; and the card 56 reveals the degree of waste. Consequently, when the record card is handed to the customer, he is apprised directly of the seriousness of the misalinement.

Although only a single embodiment of the invention has been shown and described it is to be understood that the device of the invention can be made in other ways without departing from the scope of the invention, as define by the appended claims.

I claim:

1. In vehicle wheel scuff testing means having scuff determining means engageable by the vehicle wheels and reset means engageable by the vehicle wheels in advance of the determining means for resetting the same to zero; the improvement comprising a record card holder having operative drive connection with the scuff determining means for movement therewith from a zero position to scuff indicating positions, recording means adjacent the path of movement of said holder and located at a zero position relative thereto when the determining means and said holder are set to zero, and actuating means for said recording means engageable by the vehicle wheels after their engagement with the determining means for causing said recording means to record the determined scuff on a card held by said holder.

2. In vehicle wheel scuff testing means having scuff determining means engageable by the vehicle wheels, scuff indicating means actuated by the determining means and reset means engageable by the vehicle wheels in advance of the determining means for resetting the indicating means to zero; the improvement comprising a record card holder having operative drive connection with the scuff indicating means for movement therewith, recording means adjacent the path of movement of said holder and located at a zero position relative thereto when the indicating means and said holder are set to zero, and actuating means for said recording means engageable by the vehicle wheels after their engagement with the determining means for causing said recording means to record the determined scuff on a card held by said holder.

3. In apparatus for testing the scuffing action between a vehicle tire and the road, a scuff indicator, scuff determining means movable when vehicle wheels roll over it and scuffing is present, said scuff determining means upon movement thereof causing motion of the indicator in response to said movement, a holder on said indicator for supporting a record card to move with the indicator, a recorder supported adjacent the path of movement of a record card supported by said holder, and recorder operating means actuated by vehicle wheels rolling over it to cause said recorder to be actuated and make a record on the card supported by said holder.

4. In apparatus for testing the scuffing action between a vehicle tire and the road, a support for passage of vehicles thereover, means on said support engaged by the vehicle wheels for determining tire scuff, a visual indicator operatively connected to said means for indicating the tire scuff determined thereby, a reset treadle adjacent the leading end of said support for setting said visual indicator to an initial zero reading as the vehicle wheels roll over it, a holder on said indicator for supporting a record card for movement with said indicator, a marker supported adjacent the path of movement of a card supported on said holder, and a record treadle adjacent the trailing end of said support actuated by the vehicle wheels rolling over it for causing said marker to be actuated and mark a portion of the card, said reset treadle, said indicator bar and said record treadle being positioned on said support in the path of travel of the vehicle wheels so that the wheels first roll over the reset treadle to cause the indicator to reset to its initial reading on the scale, then roll over said determining means to cause the indicator to visually indicate the scuffing action of the tire, and then roll over the record treadle to cause the marker to be actuated to mark a portion of the card.

5. In apparatus as set forth in claim 4, said indicator comprising a needle pivotally movable over a dial to indicate the scuffing action of the tire, said holder being coupled to said needle for conjoint pivotal movement, and the record card having an arcuate scale concentric with the axis of the needle and alined with the marker to provide an indication on the scale opposite the marker identical to the indication of said needle relative to said dial.

6. In apparatus as set forth in claim 5, said marker comprising a punch pivotally mounted between two side plates, at least one of said side plates having clearance for allowing passage of the portion punched out of the record card by said punch.

7. In apparatus as set forth in claim 5, a shaft journalled on said support, crank and link means connecting said shaft to said record treadle, and crank and link means connecting said shaft to said marker.

8. In apparatus as set forth in claim 5, a shaft journalled on said support parallel to said treadles, a two arm crank connected to said shaft, an extensible and contractable link for connecting said crank to said record treadle, said link being selectively connectable to either arm of said crank and being extensible and contractable for connecting said crank to either treadle thereby to constitute a selected treadle the said record treadle, and means operatively connecting said shaft to said marker.

9. In apparatus as set forth in claim 8, indicator reset means between the indicator and said reset treadle including an extensible and contractable link selectively connectible to either of said treadles thereby to constitute a selected treadle the said reset treadle, whereby the apparatus may be adapted to vehicle travel in either direction over said support upon appropriate connection of said links.

10. In apparatus for testing the scuffing action between vehicle tires and the road and having an indicator pivoted on a shaft to provide a scuffing indication, the improvement comprising a holder on said indicator for mounting a record card on the indicator in depending relation thereto so that pivotal movement of the indicator provides pivotal movement of the record card, the record card having a scale corresponding to that of the indicator, a marker supported in a fixed location adjacent the path of movement of the scale portion of the record card so that the alinement of the marker with the scale corresponds to the reading of the indicator, and means actuated by a tire rolling over it to cause said marker to be actuated and mark the alined portion of the scale of the record card.

11. A record card for use with apparatus as set forth in claim 10, wherein said record has an arcuate lower edge concentric with the pivot axis of the indicator, a scale along said edge and indicia thereon comprising part of said scale specifying the percent of tire waste caused by the determined and marked scuff.

References Cited in the file of this patent
UNITED STATES PATENTS

| | | |
|---|---|---|
| 1,890,218 | Duby | Dec. 6, 1932 |
| 2,080,909 | Charlton | May 18, 1937 |
| 2,883,762 | MacMillan | Apr. 28, 1959 |